(12) United States Patent
Cardinal et al.

(10) Patent No.: US 7,923,862 B2
(45) Date of Patent: Apr. 12, 2011

(54) REACTIVE POWER REGULATION AND VOLTAGE SUPPORT FOR RENEWABLE ENERGY PLANTS

(75) Inventors: Mark Edward Cardinal, Altamont, NY (US); Einar V. Larsen, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/574,003

(22) Filed: Oct. 6, 2009

(65) Prior Publication Data

US 2010/0134076 A1    Jun. 3, 2010

(51) Int. Cl.
*H02J 1/10* (2006.01)
(52) U.S. Cl. ......................................................... 307/57
(58) Field of Classification Search ...................... 307/57
See application file for complete search history.

(56) References Cited

U.S. PATENT DOCUMENTS

| | | | |
|---|---|---|---|
| 5,041,959 A | 8/1991 | Walker | |
| 6,909,622 B2 * | 6/2005 | Weng | 363/126 |
| 6,924,565 B2 | 8/2005 | Wilkins et al. | |
| 7,095,597 B1 * | 8/2006 | Cousineau | 361/20 |
| 7,119,452 B2 | 10/2006 | Larsen | |
| 7,166,928 B2 | 1/2007 | Larsen | |
| 7,224,081 B2 | 5/2007 | Larsen | |
| 7,531,911 B2 | 5/2009 | Rivas et al. | |
| 2007/0228838 A1 | 10/2007 | Delmerico et al. | |

* cited by examiner

*Primary Examiner* — Robert L. Deberadinis
(74) *Attorney, Agent, or Firm* — Sutherland Asbill & Brennan LLP

(57) ABSTRACT

Systems and methods are provided for reactive power regulation and voltage support for renewable energy plants. In one embodiment, a system and method are provided for coordinating voltage and reactive power output of a plant with one or more requirements associated with a utility. The method can include generating a VAR regulator output signal based at least in part on a reactive power control signal received from a utility, controlling reactive power and voltage output of the one or more power sources based at least in part on the generated VAR regulator output signal, aggregating reactive power output or the one or more power sources, and providing the aggregated reactive power to the utility.

20 Claims, 3 Drawing Sheets

REACTIVE POWER REGULATION AND VOLTAGE SUPPORT FOR RENEWABLE ENERGY PLANTS

FIELD OF THE INVENTION

This invention generally relates to power regulation, and more particularly relates to reactive power regulation and voltage support for renewable energy plants.

BACKGROUND OF THE INVENTION

Renewable energy sources, such as solar and wind farms, are becoming more economically viable as traditional fossil fuel prices continue to rise. Existing electrical power distribution (grid) infrastructure can be utilized for distributing power from renewable energy sources if the proper control system is in place for coordinating power produced with the demand of the utility. Demand for power can be measured and the demand signal can be used to control the amount of power supplied to the electrical grid by the renewable source.

Real power is generated or consumed when voltage and current are in phase. Reactive power is generated or consumed with when voltage and current are 90 degrees out of phase. A purely capacitive or purely inductive load will generally consume only reactive power (with the exception of small resistive losses) and no appreciative real power is transferred to the load. Reactive power is measured by a quantity called volts-amps-reactive, or VARs, which is a convenient mathematical quantity because apparent power is the vector sum of VARs and watts. The stability of the electrical grid is related to the generation and/or consumption of reactive power; therefore, it is usually necessary to control the reactive power output from the renewable energy source to fulfill electrical demand while providing stability for the electrical grid.

Previous reactive power management methods and systems regulate VAR commands, which are sent to wind turbines to control the instantaneous reactive power production of each wind turbine. Such methods and systems may fulfill demand and stabilize the electrical grid by generating reactive power but fail to address the short-term regulation of voltage from the power source or compensate for reactive power loss in transmission lines. Therefore, there exists a need for reactive power regulation and voltage support for renewable energy plants.

BRIEF DESCRIPTION OF THE INVENTION

Some or all of the above needs may be addressed by certain embodiments of the invention. Certain embodiments of the invention may include systems and methods for providing reactive power regulation and voltage support for renewable energy plants.

According to an exemplary embodiment of the invention, a method for coordinating voltage and reactive power output of a plant, including one or more power sources, with one or more requirements associated with a utility is provided. The method can include generating a VAR regulator output signal based at least in part on a reactive power control signal received from a utility, controlling reactive power and voltage output of the one or more power sources based at least in part on the generated VAR regulator output signal, aggregating reactive power output or the one or more power sources, and providing the aggregated reactive power to the utility.

According to another exemplary embodiment, a system for coordinating voltage and reactive power output of one or more power sources with one or more requirements associated with a utility is provided. The system can include one or more power sources. The system may include a reactive power controller that can include a reactive power regulator operable to receive a reactive power control signal from the utility, and generate a VAR regulator output signal voltage reference based at least in part on the reactive power control signal. The reactive power controller can also include a voltage regulator operable to receive the VAR regulator output signal voltage reference generated by the reactive power regulator, receive a voltage reference from the utility, and adjust the reactive power output of the one or more power sources in response to the VAR regulator output signal voltage reference received from the reactive power regulator or the voltage reference received from the utility. The system can also include an aggregator to sum the real and reactive power output from the one or more power sources and a transmission device to transmit aggregated real and reactive power to the utility.

According to another exemplary embodiment, an apparatus for coordinating voltage and reactive power output of one or more power sources with one or more requirements associated with a utility is provided. The apparatus can include a reactive power controller. The reactive power controller can include a reactive power regulator operable to receive a reactive power control signal from the utility and generate a VAR regulator output signal voltage reference based at least in part on the reactive power control signal. The apparatus can also include a voltage regulator operable to receive the VAR regulator output signal voltage reference generated by the reactive power regulator, receive a voltage reference from the utility, and adjust the reactive power output of the one or more power sources in response to the VAR regulator output signal voltage reference received from the reactive power regulator or the voltage reference received from the utility. The apparatus may also include an aggregator to sum the real and reactive power output from the one or more power sources.

Other embodiments, aspects, and features of the invention will become apparent to those skilled in the art from the following detailed description, the accompanying drawings, and the appended claims.

BRIEF DESCRIPTION OF THE DRAWINGS

Reference will now be made to the accompanying drawings, which are not necessarily drawn to scale, and wherein.

DETAILED DESCRIPTION OF THE INVENTION

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Certain embodiments of the invention can coordinate the reactive power and voltage from a variable output renewable power plant with the requirements of a utility. For example, the watt output of a renewable source power plant may vary with different operating conditions (e.g. wind turbine speed, cloud coverage, etc.), and certain embodiments of the invention can maintain the proper amount of voltage regulation and VAR (volt-amp reactive) support. The VARs may be commanded by the utility such that the VARs produced may coordinate with other voltage regulating equipment within the control area of the renewable energy plant.

According to an exemplary embodiment of the invention, an inner voltage regulator loop may regulate the voltage local to the renewable energy plant. The output of the voltage loop may command VARs to an inverter device that can produce the required VARs. According to an exemplary embodiment, the coordination of a solar or wind plant's fluctuating real power output to a distribution substation may be stabilized by proper control of voltage. The VARs produced may alter the voltage of the renewable plant such that the inner loop regulator is able to maintain relatively constant voltage when measured over short time periods. According to an exemplary embodiment, an outer loop VAR regulator may be used for utilities to adjust the net VAR output of the plant. According to exemplary embodiments of the invention, the outer loop VAR regulator may be slower than the inner loop voltage regulator, and the VAR regulator output may provide a voltage command to the voltage regulator. The VAR regulator may slowly adjust the VAR output of the plant while the inner loop voltage regulator may prevent power fluctuations from the variable resource from adversely impacting the voltage sent to the utility. The utility may command VARs to the plant such that the VAR support can be utilized by other equipment that may be regulating voltage or power factor a distance away from the renewable energy plant. Certain embodiments of the invention can facilitate installing a renewable power plant into a utility system that already employs some form of a voltage regulator.

Figure 1:
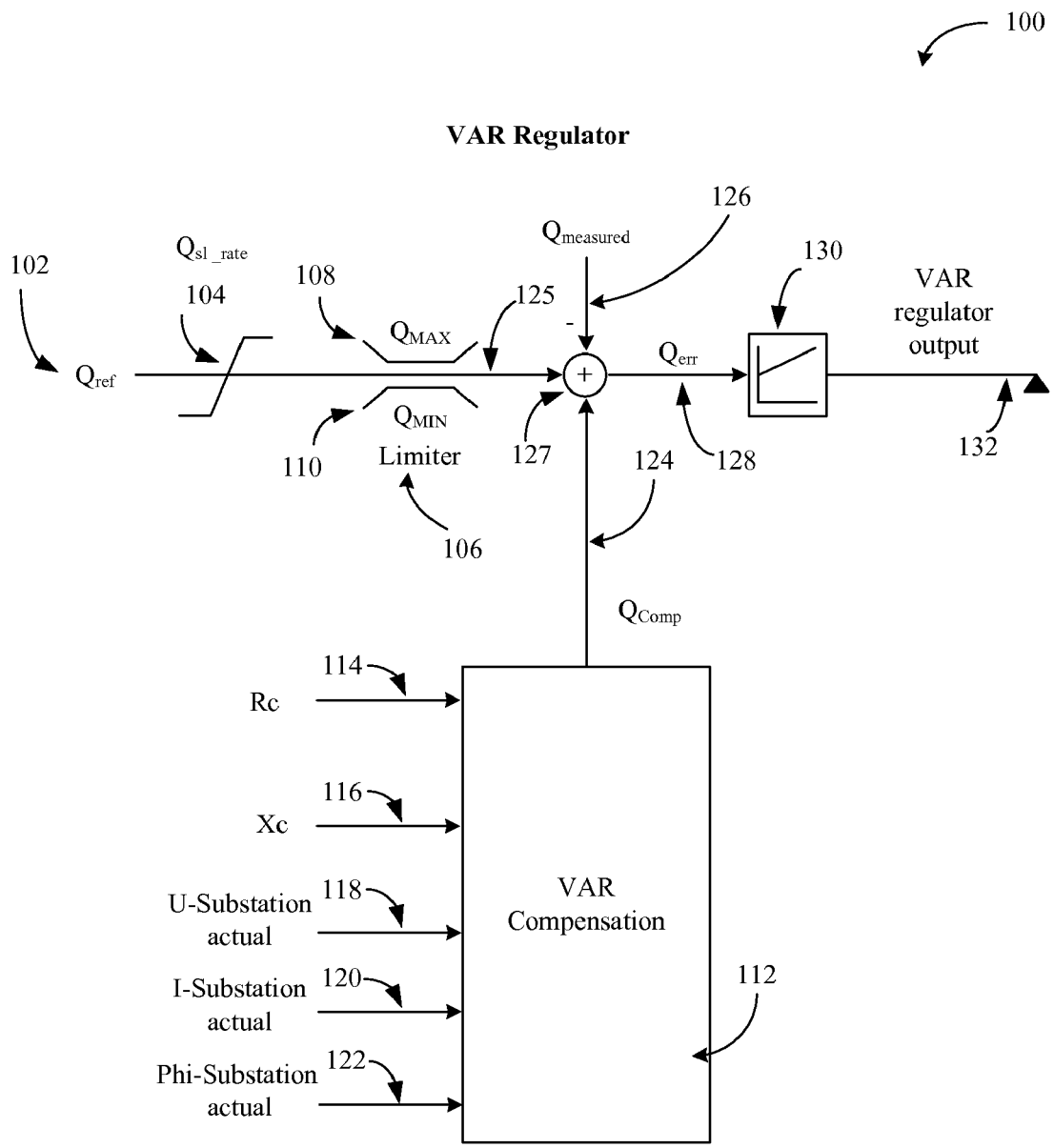
FIG. 1 is an illustrative block diagram depicting a reactive power regulator system according to an exemplary embodiment of the invention.
Figure 2:
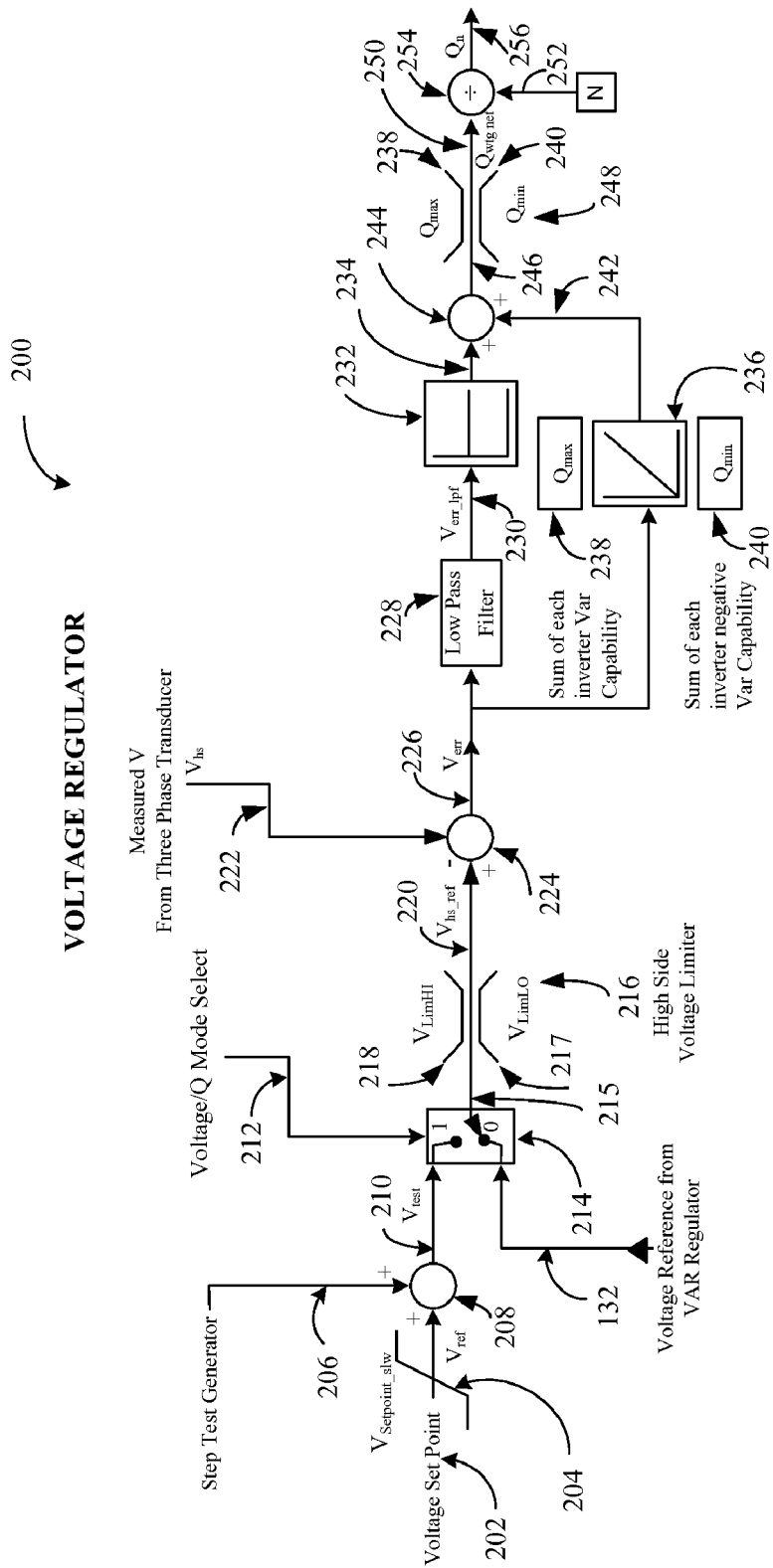
FIG. 2 depicts an illustrative block diagram of a voltage regulator system according to an exemplary embodiment of the invention.

According to certain exemplary embodiments of the invention, reactive power output from the renewable energy source(s) may be coordinated using a control system having a fast reacting voltage regulator as an inner loop, and a slower VAR regulator system as an outer loop. FIG. 1 depicts an illustrative block diagram of an exemplary outer-loop VAR regulator system 100, and FIG. 2 is a block diagram of an exemplary inner-loop voltage regulator system 200, according to exemplary embodiments of the invention.

According to exemplary embodiments of the invention, FIG. 1 shows that reactive power may be coordinated by accepting a reactive power control signal $Q_{ref}$ 102 from a utility. The slew rate, or change in the reactive power control signal $Q_{ref}$ 102 per unit time may be limited by a slew rate limiter $Q_{sl\_rate}$ 104 to prevent the VAR regulator from reacting too quickly and to limit the effects of spikes and other noise. The reactive power control signal $Q_{ref}$ 102 may be limited by an amplitude limiter 106 between a maximum reactive power level limit $Q_{max}$ 108 and a minimum reactive power level limit $Q_{min}$ 110 so that the utility-demanded reactive power control signal $Q_{ref}$ 102 does not exceed the capabilities, for example, of the VAR regulator 100 or the rest of the system components and power generation sources. The resulting slew-rate and amplitude limited reference reactive power signal 125 may be used as a reference input to a summing block 127 as will be discussed below.

FIG. 1 also shows a VAR compensation sub-system 112. According to exemplary embodiments of the system, the VAR compensation sub-system 112 may provide a compensating signal $Q_{comp}$ 124 that may be utilized to compensate for losses and other factors in the transmission lines, inverter equipment, and other components that generate, control, and/or supply real and reactive power from the renewable power source to the utility. According to exemplary embodiments, the VAR compensation sub-system 112 may be programmed or may accept information or signals from external sources. For example, signals representing the transmission line resistance Rc 114 and reactance Xc 116 may be provided. The VAR compensation sub-system 112 may utilize Rc 114 and Xc 116 signals and may also receive measurements of the substation actual voltage 118, current 120, and phase angle Phi 122 to produce the VAR compensation signal 124.

According to an exemplary embodiment of the invention, a measured reactive power signal $Q_{measured}$ 126 may be produced by measuring the reactive power output at the renewable energy source, (e.g., at the solar and/or wind farm), and a reactive power error signal $Q_{err}$ 128 may be obtained at the output of a summing node 127 by adding the VAR compensating signal $Q_{comp}$ 124 to the slew-rate and amplitude limited reference reactive power signal 125 and subtracting a measured reactive power signal $Q_{measured}$ 126 from the sum. The resulting reactive power error signal $Q_{err}$ 128 may be processed by a PI (proportional integral) controller 130 to produce a substation voltage demand signal 132, which may be used as an input to the voltage regulator system 200. In another exemplary embodiment, if the VAR compensation 112 is not utilized, the $Q_{err}$ 128 may be obtained at the output of a summing node 127 by subtracting the measured reactive power signal $Q_{measured}$ 126 from the slew-rate and amplitude limited reference reactive power signal 125.

FIG. 2 depicts an illustrative block diagram of a voltage regulator system 200 in accordance with exemplary embodiments of the invention. The voltage regulator system 200 may operate in two different modes (test and live) depending on the state of a mode select switch 214 which may be controlled by a voltage/Q mode select signal 212. When the mode select switch 214 is in position "1", the voltage regulator input signal 215 may be the test signal $V_{test}$ 210, which may be derived from summing a step test generator signal 206 and slew-rate limited 204 voltage set point 202 via a test summing block 208. When the mode select switch 214 is in position "0" as indicated in FIG. 2, the voltage regulator input signal 215 may be the VAR regulator output signal 132 produced by the VAR regulator system 100, as shown in FIG. 1, and as described above.

According to exemplary embodiments, the voltage regulator input signal 215 may be limited by a high side voltage amplitude limiter 216 so that the resulting high side reference voltage $V_{hs\_ref}$ 220 amplitude is between the minimum signal limit $V_{LimLO}$ 217 and the maximum signal limit $V_{LimHI}$ 218. According to an exemplary embodiment of the invention, and with reference to FIG. 2, a voltage error signal $V_{err}$ 226 may be produced by subtracting, at summing node 224, a high side voltage feedback signal $V_{hs}$ 222 from the high side reference voltage $V_{hs\_ref}$ 220.

According to exemplary embodiments of the invention, the voltage error signal $V_{err}$ 226 may be further processed by a low pass filter 228 to produce a low passed voltage error signal $V_{err\_1pf}$ 230. The low passed voltage error signal $V_{err\_1pf}$ 230 may be processed by a proportional filter/amplifier 232 to produce a proportional output 234. Simultaneously, the voltage error signal $V_{err}$ 226 may be processed in a separate branch of the voltage regulator system 200 via a limiting integral filter/amplifier 236, having an upper integral limit equal to the sum of each inverter positive VAR capability $Q_{max}$ 238, and a lower integral limit equal to the sum of each inverter negative VAR capability $Q_{min}$ 240, where the inverters may be utilized in a solar farm for generating alternating current from direct current power signals and for producing reactive power. The integral output 242 may be summed with the proportional output 234 at summing block 244 to produce a PI signal 246. According to exemplary embodiments of the invention, the PI signal 246 may be processed by limiter $Q_{limiter}$ 248, so that the resulting net reactive signal $Q_{wtg\_net}$ 250 amplitude is limited between the sum of each inverter positive VAR capability $Q_{max}$ 238, and the sum of each inverter negative VAR capability $Q_{min}$ 240.

According to an exemplary embodiment of the invention, N may represent the number of inverters 252 online, and a dividing block 254 may be used to divide the net reactive signal $Q_{wtg\_net}$ 250 by N to produce $Q_n$, the reactive control signal 256, that may be sent to the individual inverters for commanding reactive power and voltage.

Figure 3:
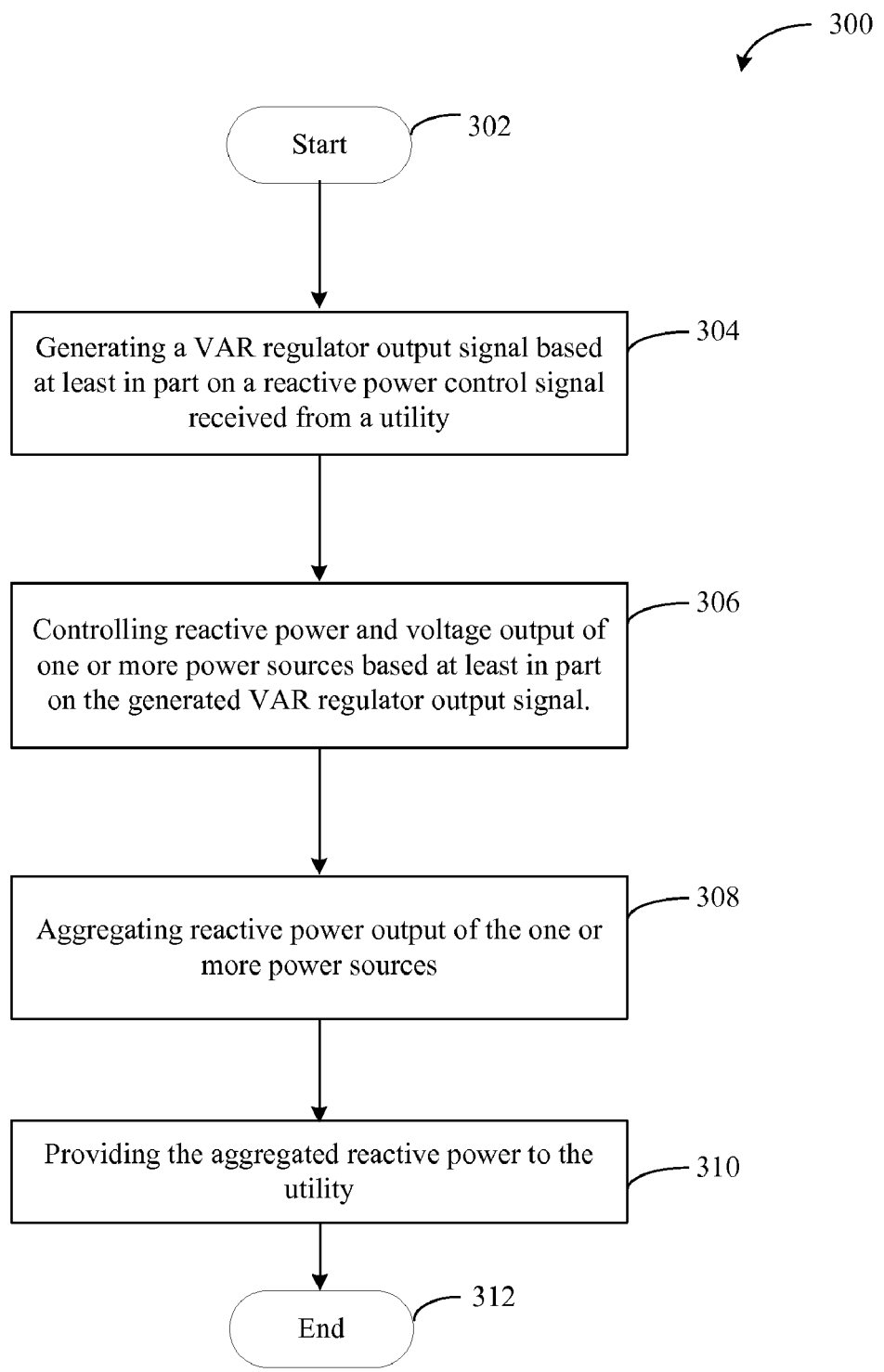
FIG. 3 is a method flowchart according to an exemplary embodiment of the invention.

According to an exemplary embodiment of the invention, the reactive power output of one or more power sources is controlled based at least in part on a reactive power control signal received from a utility. An exemplary method 300 for coordinating and providing reactive power from the alternative energy sources to a power grid will now be described with reference to the flowchart of FIG. 3. The method 300 starts in block 302. In block 304, a VAR regulator output signal (132) is generated based at least in part on a reactive power control signal (102) received from a utility. In block 306, and according to an exemplary embodiment of the invention, the reactive power and voltage output of one or more power sources may be controlled based at least in part on the generated VAR regulator output signal (132). In block 308, the method 300 may aggregate the reactive power output of the one or more power sources. In block 310, the aggregated reactive power may be provided to the utility. The method 300 ends in block 312.

In certain embodiments of the invention, the VAR regulator system 100 and the voltage regulator system 200 may include any number of software applications that are executed to facilitate any of the operations.

In certain embodiments, one or more I/O interfaces may facilitate communication between the VAR regulator system 100, the voltage regulator system 200 and one or more input/output devices. For example, a universal serial bus port, a serial port, a disk drive, a CD-ROM drive, and/or one or more user interface devices, such as, a display, keyboard, keypad, mouse, control panel, touch screen display, microphone, etc. that facilitate user interaction with the VAR regulator system 100 and the voltage regulator system 200. The one or more I/O interfaces may be utilized to receive or collect data and/or user instructions from a wide variety of input devices. Received data may be processed by one or more computer processors as desired in various embodiments of the invention and/or stored in one or more memory devices.

One or more network interfaces may facilitate connection of the VAR regulator system 100 and/or the voltage regulator system 200 inputs and outputs to one or more suitable networks and/or connections, for example, the connections that facilitate communications with any number of sensors associated with the system. The one or more network interfaces may further facilitate connection to one or more suitable networks, for example, a local area network, a wide area network, the Internet, a cellular network, a radio frequency network, a Bluetooth™ enabled network, a Wi-Fi™ enabled network, a satellite-based network, any wired network, any wireless network, etc for communication with external devices and/or systems.

As desired, embodiments of the invention may include the VAR regulator system 100 and the voltage regulator system 200 with more or less than the components illustrated in FIGS. 1 and 2.

The invention is described above with reference to block and flow diagrams of systems, methods, apparatuses, and/or computer program products according to exemplary embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for coordinating voltage and reactive power output of a plant comprising one or more power sources with one or more requirements associated with a utility, the method comprising:
    generating, at a first response rate, a VAR regulator output signal based at least in part on a reactive power control signal received from a utility;
    controlling, at a second response rate, reactive power and voltage output of the one or more power sources based at least in part on the generated VAR regulator output signal, wherein the second response rate is greater than the first response rate;
    aggregating reactive power output of the one or more power sources; and,
    providing the aggregated reactive power to the utility.

2. The method of claim 1, further comprising compensating the reactive power output of the one or more power sources to correct for loss in a transmission line that provides the aggregated reactive power to the utility.

3. The method of claim 1, wherein the controlling reactive power and voltage output of the one or more power sources comprises limiting the slew rate of the reactive power control signal.

4. The method of claim 1, wherein the controlling reactive power and voltage output of the one or more power sources comprises limiting maximum and minimum voltages of the VAR regulator output signal.

5. The method of claim 1, wherein the controlling reactive power and voltage output of the one or more power sources is further based at least in part on a high side voltage feedback signal from a device measuring one or more phase voltages of the plant.

6. The method of claim 1, wherein the controlling reactive power and voltage output of the one or more power sources is further based on dividing a net reactive power signal by a number representing the sum of inverters online associated with the one or more power sources.

7. The method of claim 1, wherein providing the aggregated reactive power to the utility is performed in response to one or more signals received from the utility.

8. A system for coordinating voltage and reactive power output of one or more power sources with one or more requirements associated with a utility, the system comprising:
    one or more power sources;
    a reactive power controller comprising:
        a reactive power regulator operable to:
            receive a reactive power control signal from the utility; and,
            generate, at a first response rate, a VAR regulator output signal voltage reference based at least in part on the reactive power control signal; and,
        a voltage regulator operable to:
            receive the VAR regulator output signal voltage reference generated by the reactive power regulator;
            receive a voltage reference from the utility; and,
            adjust, at a second response rate, the reactive power output of the one or more power sources in response to the VAR regulator output signal voltage reference received from the reactive power regulator or the voltage reference received from the utility, wherein the second response rate is greater than the first response rate;
    an aggregator to sum the real and reactive power output from the one or more power sources; and,
    a transmission device to transmit aggregated real and reactive power to the utility.

9. The system of claim 8, wherein the one or more power sources comprises at least one of the following: a photovoltaic cell, a fuel cell, a battery, or a wind turbine.

10. The system of claim 8, wherein the reactive power regulator is further operable to generate the VAR regulator output signal voltage reference in response to the reactive power control signal from the utility at a first response rate and the voltage regulator is further operable to adjust the reactive power output of the one or more power sources in response to the VAR regulator output signal voltage reference received from the reactive power regulator at a second response rate, wherein the second response rate is greater than the first response rate.

11. The system of claim 8, wherein the reactive power regulator is further operable to compensate the reactive power output of the one or more power sources to correct for loss in the transmission device.

12. The system of claim 8, wherein the reactive power regulator is further operable to generate the VAR regulator output signal voltage reference based at least in part on a feedback signal associated with a measurement of the aggregated reactive power.

13. The system of claim 8, wherein the reactive power regulator comprises a proportional-integral (PI) control to filter the VAR regulator output signal voltage reference for the voltage regulator.

14. The system of claim 8, wherein the voltage regulator is further operable to adjust the reactive power output of the one or more power sources by dividing a net reactive power signal by a number representing the sum of inverters online associated with the one or more power sources.

15. An apparatus for coordinating voltage and reactive power output of one or more power sources with one or more requirements associated with a utility, the apparatus comprising:
    a reactive power controller comprising:
        a reactive power regulator operable to:
            receive a reactive power control signal from the utility; and,
    generate, at a first response rate, a VAR regulator output signal voltage reference-based at least in part on the reactive power control signal; and,
        a voltage regulator operable to:
            receive the VAR regulator output signal voltage reference generated by the reactive power regulator;
            receive a voltage reference from the utility; and,
            adjust, at a second response rate, the reactive power output of the one or more power sources in response to the VAR regulator output signal voltage reference received from the reactive power regulator or the voltage reference received from the utility, wherein the second response rate is greater than the first response rate; and,
    an aggregator to sum the real and reactive power output from the one or more power sources.

16. The apparatus of claim 15, wherein the reactive power regulator is further operable to generate the VAR regulator output signal voltage reference in response to the reactive power control signal from the utility at a first response rate and the voltage regulator is further operable to adjust the reactive power output of the one or more power sources in response to the VAR regulator output signal voltage reference received from the reactive power regulator at a second response rate, wherein the second response rate is greater than the first response rate.

17. The apparatus of claim 15, wherein the reactive power regulator is further operable to compensate the reactive power output of the one or more power sources to correct for loss in the transmission device in communication with the utility.

18. The apparatus of claim 15, wherein the reactive power regulator is further operable to generate the VAR regulator output signal voltage reference-based at least in part on a feedback signal associated with a measurement of the aggregated reactive power.

19. The apparatus of claim 15, wherein the reactive power regulator comprises a proportional-integral (PI) control to filter the VAR regulator output signal voltage reference for the voltage regulator.

20. The apparatus of claim 15, wherein the voltage regulator is further operable to adjust the reactive power output of the one or more power sources by dividing a net reactive power signal by a number representing the sum of inverters online associated with the one or more power sources.

\* \* \* \* \*